United States Patent [19]
Lew

[11] Patent Number: 5,363,706
[45] Date of Patent: * Nov. 15, 1994

[54] CONVECTIVE ACCELERATION FLOWMETER

[76] Inventor: Hyok S. Lew, 7890 Oak St., Arvada, Colo. 80005

[*] Notice: The portion of the term of this patent subsequent to Jun. 23, 2009 has been disclaimed.

[21] Appl. No.: 952,325

[22] Filed: Sep. 28, 1992

Related U.S. Application Data

[63] Continuation of Ser. No. 617,492, Nov. 20, 1990, abandoned, which is a continuation-in-part of Ser. No. 440,693, Nov. 24, 1989, Pat. No. 5,123,287, and Ser. No. 467,481, Jan. 19, 1990, Pat. No. 5,060,523.

[51] Int. Cl.$^5$ .................................................. G01F 1/84
[52] U.S. Cl. .................................................. 73/861.38
[58] Field of Search ........................ 73/861.37, 861.38

[56] References Cited
U.S. PATENT DOCUMENTS
4,811,606 3/1989 Hasegawa et al. ................ 73/861.38

Primary Examiner—Herbert Goldstein

[57] ABSTRACT

A mass flowmeter comprises a conduit with two extremities secured to a support, which conduit includes a first and second end sections extending from the respective secured extremities thereof in a cantilever-like arrangement and a looped mid section of 360 degree loop angle connecting the first and second end sections of the conduit to one another, an electromagnetic vibrator inducing a relative flexural vibration between the two opposite halves of the conduit in directions approximately perpendicular to the looped midsection of the conduit, and a pair of vibration sensors respectively measuring the flexural vibration of the conduit at two sections respectively belonging to the two opposite halves of the conduit, wherein the mass flow rate of media moving through the conduit is determined as a function of difference in the flexural vibration between the two opposite halves of the conduit such as the phase angle difference between the two vibrations respectively measured by the two vibration sensors.

20 Claims, 2 Drawing Sheets

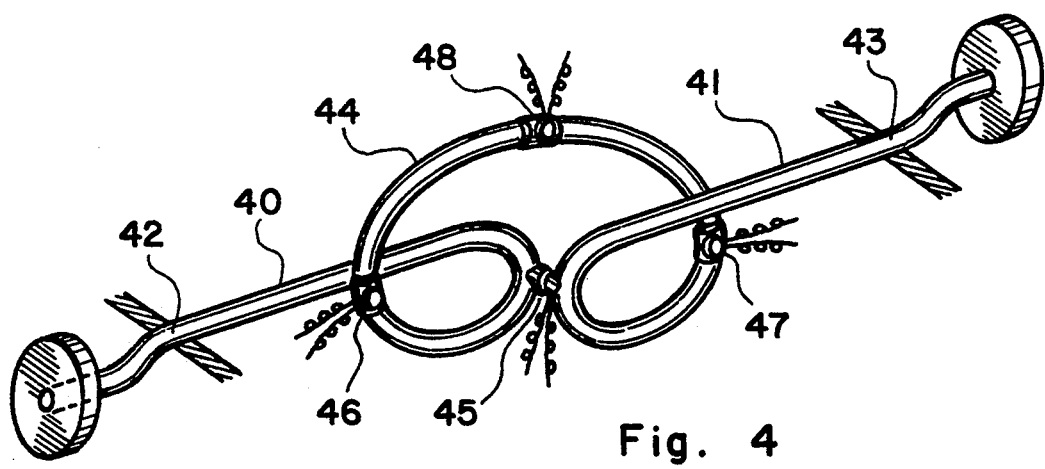
Fig. 4
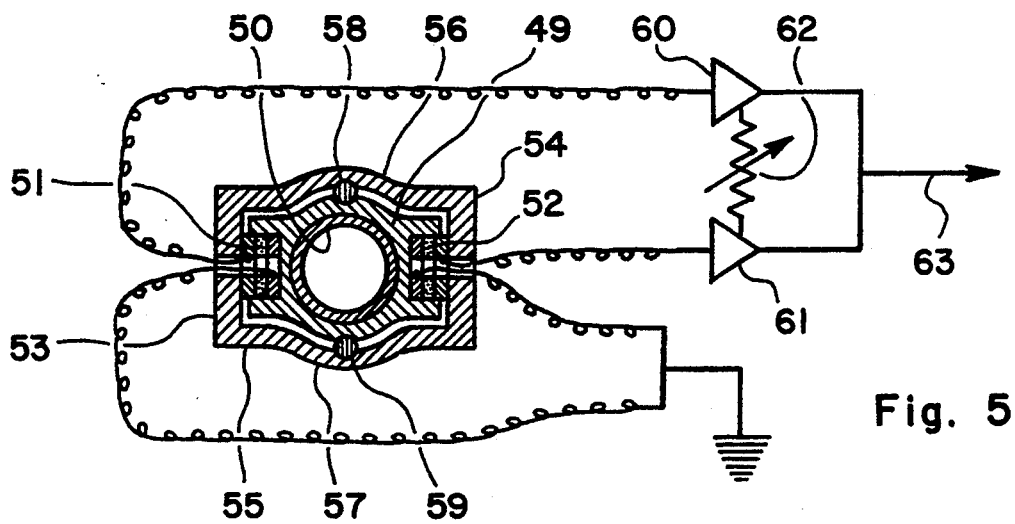
Fig. 5
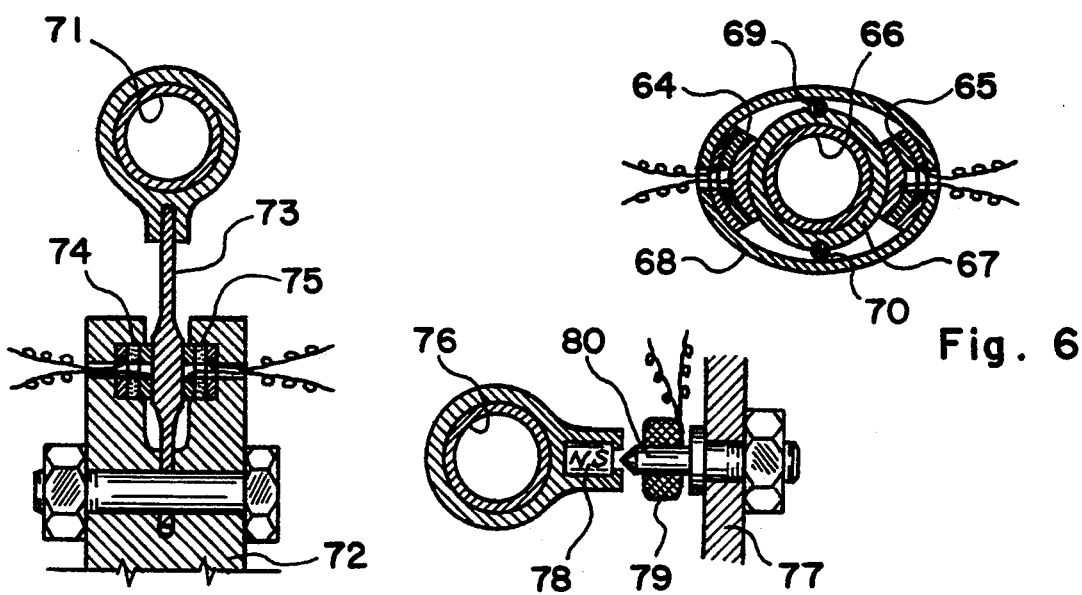
Fig. 6
Fig. 7
Fig. 8

CONVECTIVE ACCELERATION FLOWMETER

This patent application is a CONTINUATION to patent application Ser. No. 07/617,492 entitled "Convective Acceleration Flowmeter" filed on Nov. 20, 1990, now abandoned, that is a continuation-in-part to patent application Ser. No. 07/440,693, filed Nov. 24, 1989, entitled "Vibrating Conduit Mass Flowmeter" that is now U.S. Pat. No. 5,123,287, and patent application Ser. No. 07/467,481, filed Jan. 19, 1990, entitled "Vibrating Looped Conduit Mass Flowmeter" that is now U.S. Pat. No. 5,060,523.

BACKGROUND OF INVENTION

The emergence of a type of flowmeter commonly known as the "Coriolis Force" flowmeter and widespread use thereof has revolutionized the mass flow measuring technology. In spite of the headlong progress in the design and operating principles of the "Coriolis Force" flowmeters, there remains many short-comings with the existing types of the Coriolis Force flowmeter. For example, simple designs employing vibrating conduits of simple geometry such as a straight tubing lacks the ability to measure low values of mass flow rate, while designs employing vibrating conduits of complex geometry such as curved or looped conduits are bulky and heavy. Without any exception, all existing versions of the Coriolis Force flowmeter are expensive and suffer from an inability to measure low values of mass flow rates of media.

The mass flowmeter disclosed in the present patent application employs a single vibrating conduit, wherein the two opposite halves thereof are vibrated laterally in an antisymmetric mode, which contrasts the existing types employing a single or dual vibrating conduits wherein the two opposite halves thereof are vibrated in a symmetric mode.

BRIEF SUMMARY OF INVENTION

The primary object of the present invention is to provide a mass flowmeter comprising a conduit with two extremities secured to a support, which conduit includes two end sections respectively extending from the two secured extremities thereof and a curved midsection connecting the two end sections, wherein the two opposite halves of the conduit are respectively disposed on two opposite sides of a hypothetical plane cutting across the midsection of the conduit in an angle generally perpendicular to the central axis of the conduit; wherein an electromagnetic vibrating means vibrates the two opposite halves of the conduit relative to one another in directions perpendicular to a plane generally including the curved midsection of the conduit, and vibratory motion sensing means measures the difference in the flexural vibration between the two opposite halves of the conduit as a measure of mass flow rate of media moving through the conduit.

Another object is to provide the mass flowmeter described in the above-described primary object, wherein the two end sections of the conduit extend from the respective secured extremities thereof towards a generally common direction; wherein the media moving through the conduit turns in a direction in the junction between the first end section and the curved midsection of the conduit, and in the junction between the second end section and the curved midsection of the conduit, which direction of turn is opposite to the direction of turn of the media in a middle portion of the curved midsection of the conduit.

A further object is to provide the mass flowmeter described in the above described primary object, wherein the two end sections of the conduit extend from the respective secured extremities thereof towards a generally common direction; wherein the media moving through the conduit turns in a direction in the junction between the first end section and the curved midsection of the conduit, and in the junction between the second end section and the curved midsection of the conduit, which direction of turn is the same as the direction of turn of the media in a middle portion of the curved midsection of the conduit.

Yet another object is to provide the mass flowmeter described in the above-described primary object, wherein the two end sections of the conduit extend from the respective secured extremities thereof towards one another; wherein the media moving through the conduit turns in a direction in the junction between the first end section and the curved midsection of the conduit, and in the junction between the second end section and the curved midsection of the conduit, which direction of turn is opposite to the direction of turn of the media in a middle portion of the curved midsection of the conduit.

Yet a further object is to provide the mass flowmeter described in the above-described primary object, wherein the two end sections of the conduit extend from the respective secured extremities thereof towards one another; wherein the media moving through the conduit turns in a direction in the junction between the first end section and the curved midsection of the conduit, and in the junction between the second end section and the curved midsection of the conduit, which direction of turn is the same as the direction of turn of the media in a middle portion of the curved midsection of the conduit.

Still another object is to provide the mass flowmeter described in the above-described primary object, wherein the vibratory motion sensing means includes a pair of accelerometers respectively measuring the flexural vibrations of the two opposite halves of the conduit, and the mass flow rate of the media is determined from the difference between two vibratory motions respectively measured by the pair of accelerometers.

Still a further object is to provide the mass flowmeter described in the above-described primary object, wherein the vibratory motion sensing means includes a pair of relative motion sensors respectively measuring relative motions between a stationary support and the two opposite halves of the conduit, and the mass flow rate is determined from the difference between two vibratory motions respectively measured by the pair of relative motion sensors.

These and other objects of the present invention will become clear as the description thereof progresses.

BRIEF DESCRIPTION OF FIGURES

The present invention may be described with a greater clarity and specificity by referring to the following figures:

FIG. 4 illustrates a perspective view of yet another embodiment of the convective acceleration flowmeter.

FIG. 5 illustrates a cross section of an embodiment of the accelerometer usable in the construction of the convective accelration flowmeter.

FIG. 6 illustrates a cross section of another embodiment of the accelerometer usable in the construction of the convective acceleration flowmeter.

FIG. 7 illustrates a cross section of an embodiment of the relative motion sensor usable in the construction of the convective acceleration flowmeter.

FIG. 8 illustrates a cross section of another embodiment of the relative motion sensor usable in the construction of the convective acceleration flowmeter.

DESCRIPTION OF ILLUSTRATED EMBODIMENTS

Figure 1:
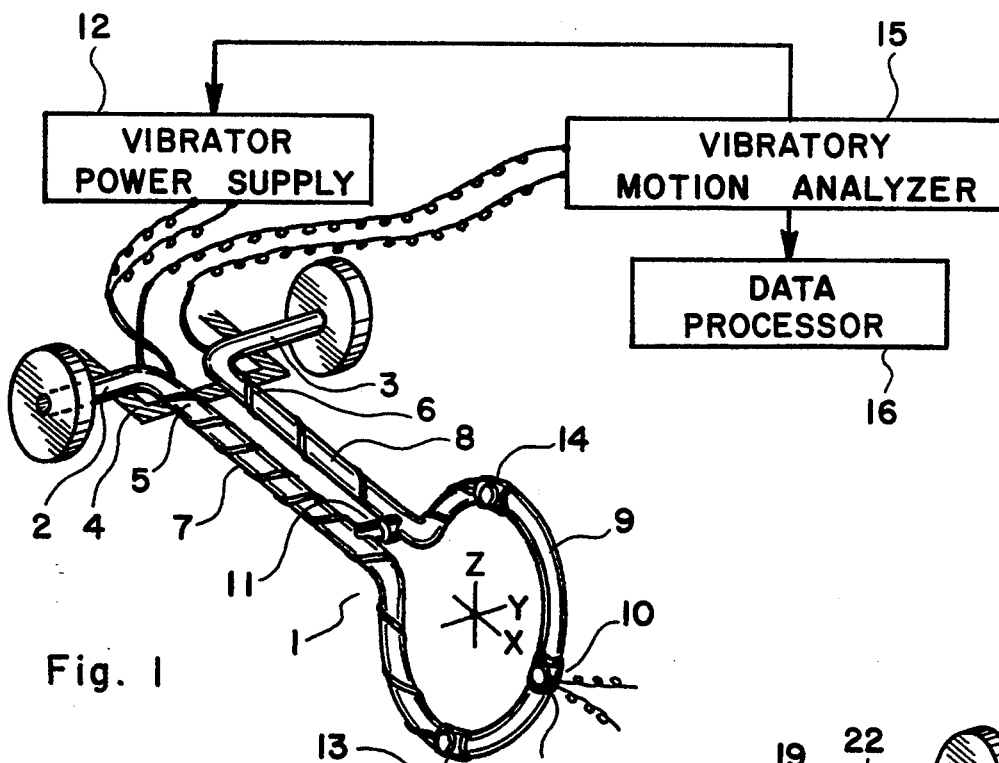
FIG. 1 illustrates a perspective view of an embodiment of the convective acceleration flowmeter of the present invention.

In FIG. 1 there is illustrated a perspective view of an embodiment of the convective acceleration flowmeter constructed in accordance with the principles of the present invention. The conduit 1 with an inlet leg 2 and an outlet leg 3 is secured to a support 4 at two extremities 5 and 6 thereof respectively adjacent to the inlet and outlet legs 2 and 3. The two end sections 7 and 8 of the conduit 1 disposed generally parallel to one another extend from the respective secured extremities 5 and 6 towards a common direction in a cantilever-like arrangement. The curved midsection 9 of the conduit 1 having an open-loop configuration generally disposed on a plane substantially perpendicular to a plane including the two end sections 7 and 8 connects the two end sections 7 and 8 to one another. It should be noticed that the two opposite halves of the conduit respectively including the two end sections 7 and 8 and the two opposite halves of the curved midsection 9 of the conduit 1 are respectively disposed on the two opposite sides of a plane generally coinciding with the x-y plane, which plane cuts through the middle section 10 of the conduit 1 in an angle generally perpendicular to the central axis of the conduit at the middle-section 10 thereof. The two opposite halves of the conduit 1 are vibrated relative to one another in lateral directions generally perpendicular to the plane including the curved midsection 9 by an electromagnetic vibrator 11 comprising an electromagnet affixed to the first end section 7 and energized by an alternating or pulsed electric current supplied by the vibrator power supply 12, and a ferromagnetic element reacting to the alternating magnetic force affixed to the second end section 8 of the conduit 1. A pair of motion sensors 13 and 14 respectively included in the two opposite halves of the curved midsection of the conduit 1 respectively measures the flexural vibratory motions of the two opposite halves of the conduit. The vibratory motion analyzer 15 analyzes the electrical signals supplied by the motion sensors 13 and 14, and the data processor 16 determines the mass flow rate and/or accumulated value thereof from a difference in the flexural vibration between the two opposite halves of the conduit 1.

It is readily recognized that the electromagnetic vibrator 11 generates a flexural vibration of the conduit 1 that is antisymmetric about the middle section 10 of the conduit 1. In other words, the first half of the conduit 1 intermediate the first secured extremity 5 and the middle section 10 is vibrated in directions always opposite to that of the second half of the conduit intermediate the second secure extremity 6 and the middle section 10. The flexural vibration of velocity v produces a convective acceleration $$U\frac{dv}{ds}$$

experienced by the media moving through the conduit 1, where U is the velocity of media moving through the conduit 1 and $$\frac{dv}{ds}$$

is the space rate of change of the flexural vibration velocity v in the direction following the central axis of the conduit 1. The convective acceleration $$U\frac{dv}{ds}$$

experienced by the media moving through the conduit 1 produces a dynamic reaction force $$-\rho UA\frac{dv}{ds}$$

exerted on the conduit 1 by the media moving therethrough, where $\rho$ is the density of the media in the conduit 1 and A is the cross section area of the flow passage provided by the conduit 1. It is readily recognized that the dynamic reaction force $$-\rho UA\frac{dv}{ds}$$

has a symmetric distribution about the middle section 10 of the conduit 1. In summary, the primary flexural vibration having an antisymmetric distribution, that is induced by the electromagnetic vibrator 11, produces a secondary flexural vibration having a symmetric distribution, that is generated by the dynamic reaction force of the media moving through the conduit. As the amplitude of the dynamic reaction force is proportional to the mass flow rate of the media moving through the conduit 1, the amplitude of the secondary flexural vibration is proportional to the mass flow rate $\rho UA$. It is a well known fact that the amplitude of the secondary flexural vibration is proportional to the phase angle difference in the resultant flexural vibration between the two opposite halves of the conduit 1. Consequently, the mass flow rate of the media is determined from the phase angle difference between the two flexural vibratory motions respectively measured by the pair of motion sensors 13 and 14, wherein the proportionality relationship therebetween is determined by calibrating the flowmeter. It should be mentioned that the middle section 10 of the conduit is a nodal point in the flexural vibration, whereat the flexural vibration vanishes when the mass flow rate is equal to zero. Therefore, the mass flow rate may be determined from the amplitude of the flexural vibration of the conduit 1 measured at the nodal section by a motion sensor 17 disposed at the middle section 10 of the conduit 1. In actual practice, there may be a residual flexural vibration at the nodal point and, consequently, the mass flow rate of the media should be determined from the amplitude of the flexural vibration measured at the nodal section minus the amplitude of the residual flexural vibration determined and recorded during the calibration of the flowmeter. In general, it is desirable to vibrate the conduit at its natural frequency, which natural frequency of the flexural vibration can be determined by energizing the electromagnetic vibrator 5 in a frequency sweep mode, wherein the natural frequency is equal to the frequency producing the maximum amplitude of the flexural frequency, which information is fed back from the vibratory motion analyzer 15 to the vibratory power supply 12. It is well known that the density of media can be determined from the natural frequency of the flexural vibration of the conduit 1 and, consequently, the data processor may also determine the density of media from the natural frequency of the flexural vibration of the conduit induced by the electromagnetic vibrator 11.

Figure 2:
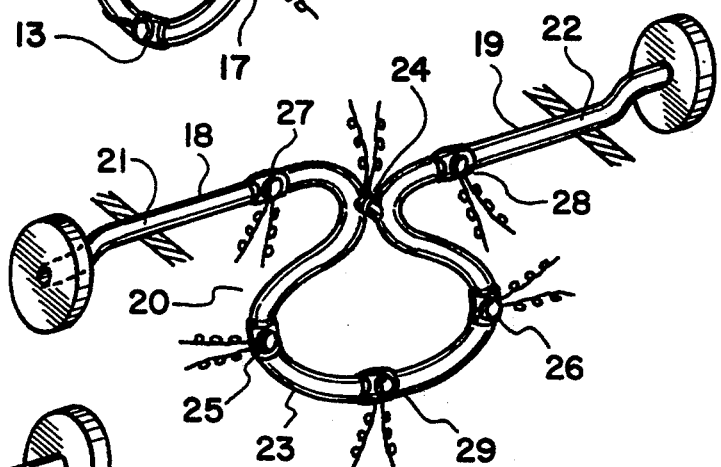
FIG. 2 illustrates a perspective view of another embodiment of the convective acceleration flowmeter.

In FIG. 2 there is illustrated a perspective view of another embodiment of the convective-acceleration flowmeter, that is merely a structural modification of the embodiment shown in FIG. 1 and operates on the same principles, which embodiment is obtained by bending the two end sections 7 and 8 included in the embodiment shown in FIG. 1 over 90 degrees in two opposite directions on a plane generally parallel to the plane including the curved midsection 9 of the conduit 1. As a consequence, the two end sections 18 and 19 of the conduit 20 extend towards one another from the respective secured extremities 21 and 22 thereof, which are connected to one another by a Ω-shaped midsection 23. The electromagnetic vibrator 24 induces flexural vibration of antisymmetric distribution. The mass flow rate of the media is determined from the phase angle difference between the two flexural vibrations respectively measured by the two vibratory motion sensors 25 and 26 respectively included in the two opposite halves of the curved midsection 23 of the conduit 20, or two vibratory motion sensors 27 and 28 respectively disposed in the two end sections 18 and 19 as an alternative design. Of course, the mass flow rate may be determined from the amplitude of the flexural vibration measured by the motion sensor 29 disposed at the middle section of the conduit. It should be mentioned that the two motion sensors 13 and 14 shown in FIG. 1 may be relocated to the two end sections 7 and 8 in an arrangement equivalent to the installation of the two motion sensors 27 and 28 shown in FIG. 2. It should be noticed that the two opposite halves of the conduit 20 are respectively disposed on two opposite sides of a plane generally parallel to the x-y plane and cutting through the middle section of the conduit 20 at a generally perpendicular angle. In the embodiments shown in FIGS. 1 and 2, the media moving through the conduit in the junction between the first end section and the curved midsection, and in the junction between the second end section and the curved midsection turns in a direction opposite to the direction of turn of the media in a middle portion of the curved midsection of the conduit.

Figure 3:
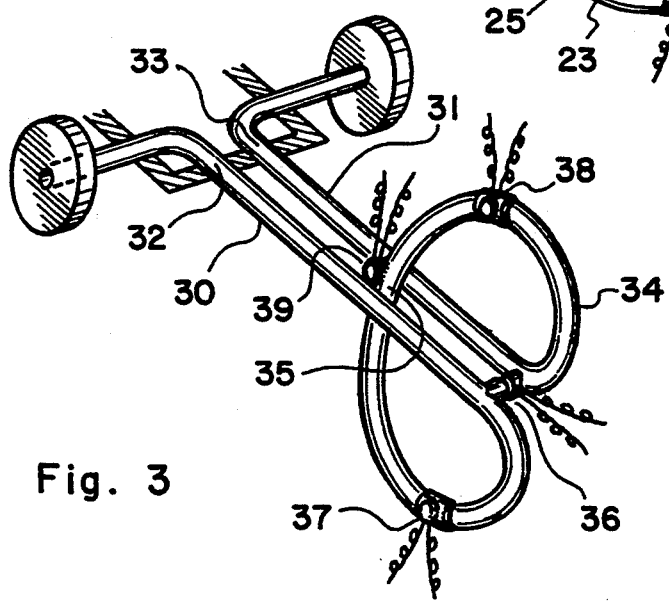
FIG. 3 illustrates a perspective view of a further embodiment of the convective acceleration flowmeter.

In FIG. 3 there is illustrated a perspective view of a further embodiment of the convective acceleration flowmeter, that is another structural modification of the embodiment shown in FIG. 1, wherein the former results when the curved midsection of the latter is rotated over 180 degrees about an axis perpendicular to the plane including the two end sections. The two end sections 30 and 31 of the conduit extending from respective secured extremities 32 and 33 towards a generally common direction are connected to one another by a curved midsection 34, wherein the middle section 35 of the conduit is disposed intermediate the secured extremities 23 and 33 and the over-hanging extremities of the two end sections, and between the two end sections 30 and 31. The electromagnetic vibrator 36 induces flexural vibration of an antisymmetric distribution, while the two vibratory motion sensors 37 and 38 respectively included in the two opposite halves of the curved midsection 34 measures the flexural vibrations of the two opposite halves of the conduit, wherein the mass flow rate is determined from the phase angle difference therebetween. The mass flow rate may be also determined from the amplitude of the flexural vibration generated by the mass flow and measured by the motion sensor 39 disposed at a nodal section coinciding with the middle section 35 of the conduit. Of course, the pair of motion sensors 37 and 38 may be relocated to the midsections of the two end sections 30 and 31 adjacent to the middle section 35 of the conduit. As mentioned in conjunction with FIG. 1, the density of media can be determined from the natural frequency of the flexural vibration. It should be noticed that the two opposite halves of the conduit are respectively disposed on two opposite sides of a plane generally perpendicular to the plane substantially including the curved midsection 34 of the conduit and cutting through the middle section 35 of the conduit at a generally perpendicular angle.

In FIG. 4 there is illustrated a perspective view of yet another embodiment of the convective acceleration flowmeter, that is a structural modification of the embodiment shown in FIG. 3, wherein the former results when the two end sections 30 and 31 of the latter are bent over 90 degrees in two opposite directions on a plane generally including the curved midsection 34 of the conduit. The two end sections 40 and 41 of the conduit extending from the respective secured extremities 42 and 43 thereof~towards one another are connected to one another by a curved midsection 44 of the conduit of heart shaped configuration. The electromagnetic vibrator 45 generates flexural vibration of an antisymmetric distribution, while the two vibratory motion sensors 46 and 47 measure flexural vibrations of the two opposite halves of the conduit, wherein the mass flow rate of the media is determined from the phase angle difference therebetween. The mass flow rate may be determined from the amplitude of the flexural vibration generated by the mass flow of the media and measured by the motion sensor 48 disposed at a nodal section coinciding with the middle section of the conduit. The pair of motion sensors 46 and 47 may be relocated to the two end sections 40 and 41 in an alternative design as exemplified by the two motion sensors 27 and 28 included in the embodiment shown in FIG. 2. It should be noticed that the two opposite halves of the conduit are respectively disposed on two opposite sides of a plane generally perpendicular to a plane generally including the curved midsection 44 of the conduit and cutting through the middle section of the conduit at a generally perpendicular angle. It should be mentioned that the media moving through the conduit employed in the embodiments shown in FIGS. 3 and 4 turns in the same direction in the junction between the first end section and the curved midsection of the conduit and in the junction between the second end section and the curved midsection of the conduit as the direction of turn of the media in a middle portion of the curved midsection of the conduit. It should be understood that the middle section of the conduit coinciding with the nodal section may be secured to a support structure.

In FIG. 5 there is illustrated a cross section of an embodiment of the motion sensor employed in the construction of the convective acceleration flowmeter shown in FIGS. 1 through 4. A transducer holder 49 is fixedly mounted on the conduit 50 providing the flow passage, which transducer holder 49 includes a pair of piezo electric eleemnts 51 and 52 respectively disposed on two diametrically opposite sides of the conduit 50 across a plane substantially perpendicular to the directions of the flexural vibration of the conduit. Each of the two piezo electric elements sandwiched between two electrodes insulated from the surrounding elements are under compression as the two retainer caps 53 and 54 included in the retainer 55 are pulled towards one another by relatively thin side walls 56 and 57 under tensions created by the pins 58 and 59 driven between the retainer 55 and the holder 49. One of the two electrodes respectively included in each of the two piezo electric elements is connected to one of the two amplifiers 60 and 61, which combination has a signal balancing means 62 therebetween. The other electrodes of the piezo electric elements not connected to the amplifiers 60 or 61 are grounded. The electrodes of the two piezo electric elements 51 and 52 connected to the amplifiers 60 and 61 are selected in such a way that they generate electromotive forces of the same polarity under the flexural vibration of the conduit, whereby the two electromotive forces respectively generated by the two piezo electric elements 51 and 52 are combined in such a way that the noises are cancelled between the two amplifiers 60 and 61 by adjusting the signal balancing means 62 and a resultant electrical signal 63 representing the flexural vibration of the conduit is obtained. In an alternative arrangement, the electrodes of the two piezo electric elements connected to the two amplifiers may be selected in such a way that they generate electromotive forces of two opposite polarities, which are now combined by a combination of a noninverting and an inverting amplifier with a signal balancing means therebetween. It should be mentioned that only one of the two piezo electric elements and only one of the two amplifiers without the signal balancing means may be retained in a simpler version of the vibratory motion sensor, that is an alternative to the embodiment shown in FIG. 5.

In FIG. 6 there is illustrated a cross section of another embodiment of the vibratory motion sensor, that is a modification of the embodiment shown in FIG. 5. The pair of curved piezo electric elements 64 and 65, each of which includes a pair of electrodes with matched surface geometry sandwiching the piezo electric element, are disposed in a diametrically symmetric arrangement across the conduit 66 providing the flow passage and retained between an inner circular cylindrical retainer 67 fixedly mounted on the conduit 66 and an outer elliptical cylindrical retainer 68 in a squeezed arrangement therebetween, wherein the compressive forces compressing each of the two piezo electric elements 64 and 65 are created by the pins 69 and 70 driven between side walls of the inner and outer cylindrical retainers 67 and 68. A simplified version of the embodiment shown in FIG. 6 may include only one of the two piezo electric elements.

In FIG. 7 there is illustrated a cross section of a further embodiment of the vibratory motion sensor usable in constructing the convective acceleration flowmeter, that measures relative vibratory motion between the conduit 71 and a rigid support 72 structurally integrated to the support securing the two extremities of the conduit 71. An elongated flexible member 73 with one extremity anchored to the rigid support 72 and the other extremity connected to the conduit 71 is disposed in a direction generally perpendicular to the directions of the flexural vibration of the conduit 71 and to the central axis of the conduit 71. A pair of piezo electric elements 74 and 75 are disposed on two opposite sides of the elongated flexible member 73, wherein each of the two piezo electric elements is under squeezing action between the elongated flexible member 73 and the one of the two halves of the rigid support 72. The lead wires extending from the electrodes of the piezo electric elements may be connected to the amplifiers with noise cancelling means as shown and described in conjunction with FIG. 5. A simplified version of the motion sensor shown in FIG. 7 may include only one of the two piezo electric elements shown in FIG. 7. It should be mentioned that a piezo electric force sensor commonly employed in the construction of the vortex shedding flowmeters, that includes an elongated force transmitting member extending from a thin end wall of the cylindrical transducer container vessel anchored to the rigid support, may be used in place of the motion sensor shown in FIG. 7.

In FIG. 8, there is illustrated a cross section of yet another embodiment of the vibratory motion sensor usable in the construction of the convective acceleration flowmeter, that measures relative vibratory motion between the conduit 76 and a rigid support 77 structurally integrated to the support anchoring the two secured extremities of the conduit. A permanent magnet 78 affixed to the conduit 76 provides a magnetic field that induces an electromotive force in an induction coil 79 wound on a ferromagnetic core 80, when there is a relative motion between the permanent magnet 78 and the ferromagnetic core 80. Of course, the combination of the induction coil 79 and the ferromagnetic core 80 may be affixed to the conduit 76, while the permanent magnet 78 is anchored to the rigid support 77 in an alternative design. It should be understood that other motion sensors or displacement sensors such as those employing optical fiber, strain gauge, and capacitive disc element, etc. may be used in place of the embodiments shown in FIGS. 5 through 8.

The structural embodiments shown and described in conjunction with FIGS. 1 through 4 can be summarized as follows: The embodiment shown in FIG. 1 comprises a conduit with two end sections secured to a supporting structure and extending in a common direction in a parallel relationship therebetween, wherein a looped midsection of a loop angle approximately equal to 360 degrees connects the two end sections to one another. An electromagnetic vibrator with an action and reaction element respectively secured to the two end sections of the conduit, that is disposed near the looped midsection of the conduit, generates a relative flexural vibration between the two opposite halves of the conduit in directions approximately perpendicular to a plane defined by the central axis of a central portion of the looped midsection of the conduit. Two motion sensors respectively included in the two opposite halves of the conduit convert the flexural vibration of the two opposite halves of the conduit into two alternating electrical signals. The mass flow rate of media moving through the conduit is determined as a function of the difference in the flexural vibration between the two opposite halves of the conduit, which difference created by the interaction between the flexural vibration of the conduit and the motion of the media moving through the conduit may be measured in terms of the phase angle difference between the two electrical signals or the the amplitude difference therebetween, or the amplitude of an electrical signal generated by a single motion sensor included in the center section of the conduit. It should be noticed that the central axes of the two opposite halves of the conduit are respectively located on the two opposite sides of a plane intersecting the center section of the conduit in a perpendicular relationship, and that the relative flexural vibration of the two opposite halves of the conduit takes place in directions approximately perpendicular to a plane defined by the central axis of a central portion of the looped midsection of the conduit. It is not difficult to realize that the two end sections and the looped midsection of the conduit can be disposed on a single common plane in an alternative design, wherein the electromagnetic vibrator is now disposed intermediate the two end sections of the conduit whereby the electromagnetic vibrator exerts the vibratory force in directions perpendicular to the plane including the central axes of the two end sections and the looped midsection of the conduit. The embodiment shown in FIG. 2 results when the two end sections of the conduit shown in FIG. 1 are bent over 90 degree angle at the sections thereof adjacent to the looped midsection of the conduit respectively in two opposite directions parallel to a plane defined by the central axis of the center portion of the looped midsection of the conduit, in which modified embodiment the two end sections of the conduit extend from the respective secured extremities towards one another. The two motion sensors respectively included in the two opposite halves of the looped midsection of the conduit may be relocated to the two end sections of the conduit, respectively, which modification may also be incorporated into the other embodiments shown in FIGS. 1, 2 and 4. It should be noticed that the central axes of the two opposite halves of the conduit are respectively located on the two opposite sides of a plane intersecting the center section of the looped midsection of the conduit in a perpendicular relationship. In the particular embodiment shown in FIG. 2, the two end sections of the conduit are respectively disposed on two parallel planes off set from one another. In an alternative embodiment, the two end sections and the looped midsection of the conduit may be disposed on a common plane, wherein a spacing is provided between the two curved transition sections between the end sections and the looped midsection of the conduit, which spacing accommodates the electromagnetic vibrator exerting the vibratory force in directions perpendicular to the plane defined by the conduit of a coplanar geometry. The embodiment shown in FIG. 3 results when the looped midsection of the conduit shown in FIG. 1, that is disposed beyond the over-hanging extremities of the two end sections of the conduit, is relocated to a space between the two end sections of the conduit. In this particular embodiment, the two end sections of the conduit cannot be relocated to a common plane including the looped midsection of the conduit. The embodiment shown in FIG. 4 results when the looped midsection of the conduit shown in FIG. 2, that is disposed on one side of a plane including the central axes of the two end sections of the conduit and perpendicular to a plane defined by the central axis of the central portion of the looped midsection of the conduit, is made to extend across the plane defined by the two end sections of the conduit through a space between the two end sections of the conduit. The conduit employed in this particular embodiment cannot be modified to a coplanar geometry, as the looped midsection of the conduit must extend through the space between the two end sections of the conduit.

While the principles of the invention have now been made clear by the illustrative embodiments shown and described, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or privilege is claimed, are defined as follows:

1. An apparatus for measuring mass flow rate of media moving through a conduit comprising in combination:

a) a conduit of a constant shape with two extremities secured to a supporting structure including a first end section disposed on a first plane and extending from one of the two secured extremities of the conduit, a second end section disposed on a second plane and extending from the other of the two secured extremities of the conduit, and a looped midsection of loop angle approximately equal to 360 degrees disposed substantially intermediate said first and second planes; wherein the center line of a first half of the conduit including the first end section and a first half of the looped midsection of the conduit is disposed on one side of a center plane intersecting a middle portion of the looped midsection of the conduit in a perpendicular relationship and dividing the conduit into two equal opposite halves, said center line of the first half of the conduit being a line passing through the geometrical center of every cross section of the first half of the conduit, and the center line of a second half of the conduit including the second end section and a second half of the looped midsection of the conduit is disposed on the other side of said center plane opposite to said one side, said center line of the second half of the conduit being a line passing through the geometrical center of every cross section of the second half of the conduit;

b) means for exerting vibratory force with action and reaction elements respectively secured to overhanging extremities of the first and second end sections of the conduit opposite to the respective secured extremities of the first and second end sections of the conduit and adjacent to the looped midsection of the conduit, wherein said means for exerting vibratory force exerts vibratory forces to the first and second halves of the conduit in two opposite directions on a single line of action approximately perpendicular to a reference plane substantially including a central portion of the center line of the looped midsection of the conduit and approximately parallel to the looped midsection of the conduit, said center line of the looped midsection of the conduit being a line passing through the geometrical center of every cross section of the looped midsection of the conduit; wherein said vibratory forces generate a relative flexural vibration between the first and second halves of the conduit in directions approximately perpendicular to said reference plane; and c) means for detecting difference in the flexural vibration between the first and second halves of the conduit as a measure of mass flow rate of media moving through the conduit.

2. An apparatus as defined in claim 1 wherein said combination includes means for determining the mass flow rate of media as a function of the difference in the flexural vibration between the first and second halves of the conduit.

3. An apparatus as defined in claim 2 wherein said combination includes means for determining density of the media as a function of a natural frequency of the relative flexural vibration between the first and second halves of the conduit.

4. An apparatus as defined in claim 1 wherein said means for detecting difference in the flexural vibration between the first and second halves of the conduit comprises two motion sensors respectively measuring the flexural vibration of the conduit at two sections respectively belonging to the first and second halves of the conduit.

5. An apparatus as defined in claim 4 wherein said combination includes means for determining the mass flow rate of media as a function of the difference in the flexural vibration between the first and second halves of the conduit.

6. An apparatus as defined in claim 1 wherein said means for detecting difference in the flexural vibration between the first and second halves of the conduit comprises two accelerometers respectively included in the first and second halves of the conduit.

7. An apparatus as defined in claim 6 wherein said combination includes means for determining the mass flow rate of media as a function of the difference in the flexural vibration between the first and second halves of the conduit.

8. An apparatus as defined in claim 1 wherein said means for detecting difference in the flexural vibration between the first and second halves of the conduit comprises a motion sensor measuring the flexural vibration of the conduit at the middle portion of the conduit, whereat the flexural vibration of the conduit vanishes when the media contained within the conduit is stationary.

9. An apparatus as defined in claim 1 wherein the first and second end sections of the conduit extend from the respective secured extremities of the first and second end sections of the conduit towards a common direction, and the looped midsection of the conduit is disposed beyond the over-hanging extremities of the first and second end sections of the conduit.

10. An apparatus as defined in claim 9 wherein said means for detecting difference in the flexural vibration between the first and second halves of the conduit comprises two vibration sensors respectively measuring the flexural vibration of the conduit at two sections respectively belonging to the first and second halves of the conduit.

11. An apparatus as defined in claim 10 wherein said combination includes means for determining the mass flow rate of media as a function of the difference in the flexural vibration between the first and second halves of the conduit.

12. An apparatus as defined in claim 1 wherein the first and second end sections of the conduit extend from the respective secured extremities of the first and second end sections of the conduit towards a common direction, and the looped midsection of the conduit is disposed intermediate the secured extremities and the over-hanging extremities of the first and second end sections of the conduit.

13. An apparatus as defined in claim 12 wherein said means for detecting difference in the flexural vibration between the first and second halves of the conduit comprises two vibration sensors respectively measuring the flexural vibration of the conduit at two sections respectively belonging to the first and second halves of the conduit.

14. An apparatus as defined in claim 13 wherein said combination includes means for determining the mass flow rate of media as a function of the difference in the flexural vibration between the first and second halves of the conduit.

15. An apparatus as defined in claim 1 wherein the first and second end sections of the conduit extend respectively from the two secured extremities of the conduit towards one another, and the looped midsection of the conduit is disposed on one side of a plane including the center lines of the first and second end sections of the conduit and approximately perpendicular to said reference plane.

16. An apparatus as defined in claim 15 wherein said means for detecting difference in the flexural vibration between the first and second halves of the conduit comprises two vibration sensors respectively measuring the flexural vibration of the conduit at two sections respectively belonging to the first and second halves of the conduit.

17. An apparatus as defined in claim 16 wherein said combination includes means for determining the mass flow rate of media as a function of the difference in the flexural vibration between the first and second halves of the conduit.

18. An apparatus as defined in claim 1 wherein the first and second end sections of the conduit extend respectively from the two secured extremities of the conduit towards one another, and the looped midsection of the conduit straddles a plane including the center lines of the first and second end sections of the conduit and approximately perpendicular to said reference plane.

19. An apparatus as defined in claim 18 wherein said means for detecting difference in the flexural vibration between the first and second halves of the conduit comprises two vibration sensors respectively measuring the flexural vibration of the conduit at two sections respectively belonging to the first and second halves of the conduit.

20. An apparatus as defined in claim 19 wherein said combination includes means for determining the mass flow rate of media as a function of the difference in the flexural vibration between the first and second halves of the conduit.

* * * * *